Feb. 26, 1952     G. C. RICHARDSON ET AL     2,587,221
PREGNANCY TEST
Filed March 16, 1949
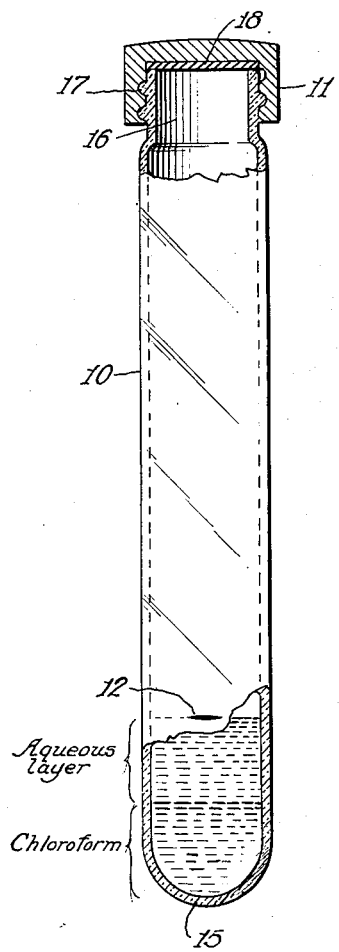
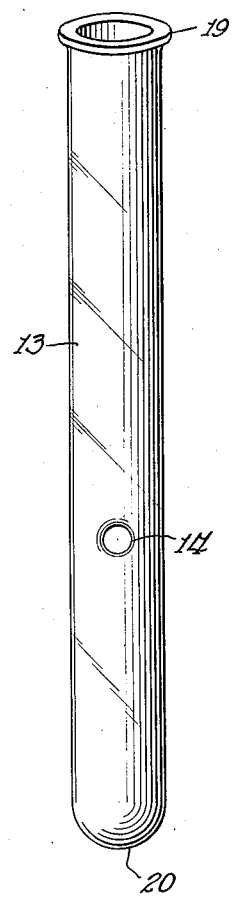
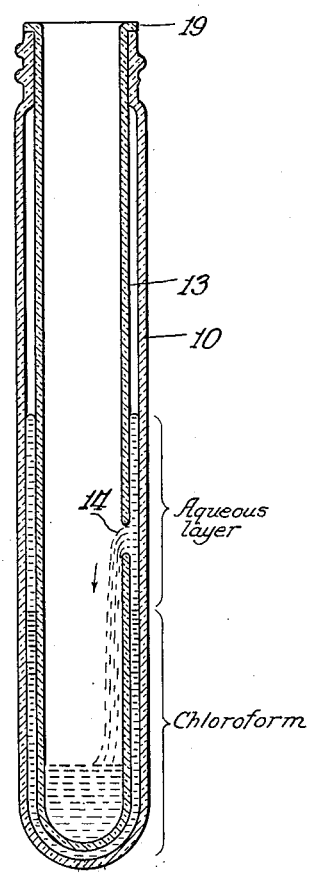
Inventors:
Garwood C. Richardson
and
Gustav W. Rapp
By: Soans, Pond & Anderson Attys Patented Feb. 26, 1952

2,587,221

UNITED STATES PATENT OFFICE 2,587,221

PREGNANCY TEST

Garwood C. Richardson, Chicago, and Gustav W. Rapp, Glen Ellyn, Ill., assignors to Chicago Endocrine Research Company, Chicago, Ill., a corporation of Illinois Application March 16, 1949, Serial No. 81,828

4 Claims. (Cl. 23—230)

The present invention relates to improved tests for determining pregnancy and includes improved apparatus for carrying out certain preferred pregnancy tests.

The art has long desired a simple, relatively inexpensive, rapid and accurate means for determining pregnancy in mammalia and particularly in women. The biological tests employed heretofore such as the rat, rabbit and frog, as well as the prostigmin skin tests, have proven complex and due to the complicated nature of the tests involved, to be relatively expensive and time consuming. Also, some of the tests available heretofore have been found to be lacking in desired accuracy, particularly during the early days of pregnancy.

The principal object of the present invention is to provide a simple, inexpensive, concise and accurate test for determining pregnancy, including early pregnancy in mammalia.

Another object of the present invention is to provide a rapid test for determining pregnancy which is capable of providing an accurate answer, confirming or ruling out pregnancy, during the patient's visit to the doctor's office, clinical laboratory or hospital.

A further object of the present invention is to provide a simple and inexpensive apparatus for carrying out certain preferred pregnancy tests.

Other objects of the present invention will be apparent as the detailed description proceeds hereinafter.

The improved tests employed in the present invention are based on the identification of estrone, a hormone associated with pregnancy, in the urine from pregnant animals, e. g. cows, horses and dogs as well as women. There is a possibility, particularly during the menstrual cycle, that female urine may contain progesterone, another female hormone, in substantial amounts. This latter hormone has been found to give with the tests of the present invention, what may be termed "false positive" tests for pregnancy, and its presence thus interferes with proper identification of estrone. It, therefore, follows, for an accurate evaluation of pregnancy in accordance with the tests of the present invention, (1) that progesterone must be separated from estrone or (2) that progesterone must be chemically modified so as not to interfere with proper identification of estrone. We have discovered that this may be readily accomplished by the procedures described below.

Separation of progesterone

The separation of progesterone and other interfering steroid substances from estrone in urine is accomplished by adding alkali to urine and extracting the resulting alkalinized urine with a water immiscible organic solvent. In this process the estrone to be identified remains in the aqueous layer or solution, and the progesterone, along with any other interfering steroid substances present in the urine, are taken up in the extract where they remain in the water immiscible layer or organic solvent. In our preferred testing method, alkali metal hydroxide such as sodium or potassium hydroxide is used as the alkali and an organic solvent which is heavier or lighter than water such as chloroform, carbon tetrachloride, carbon disulphide, benzene, heptane or ether, is used as the water immiscible solvent. While the aqueous layer containing the estrone may be separated from the organic solvent layer by any suitable means as, for example, by decantation, by the use of a separatory funnel, etc., we prefer to use the simple and inexpensive extraction apparatus shown in the accompanying drawing.

The extraction apparatus comprises primarily an outer chamber or relatively large tube 10 and an inner tube or relatively small tube 13. The outer chamber is provided with a screw cap 11 and a mark identified at 12 as means for determining volumes of reagents to be used. The inner tube is provided with a hole or inlet opening 14, and the inner tube is of such size that it may be readily inserted into the outer chamber. The preferred method of using the extraction apparatus is described in detail in Example I.

Modification of progesterone

The chemical modification of progesterone, along with any other masking or interfering ketonic substances (pyruvic acid, acetone, etc.,) present in urine, is accomplished by adding alkali to urine and reactng the resulting alkalinized urine with a water soluble hypohalide, e. g. alkali metal hypoiodides, hypochlorides, etc. In our preferred testing method alkali metal hydroxide such as sodium or potassium hydroxide is used as the alkali and the alkalinized urine is reacted with an aqueous iodine/potassium iodide solution or aqueous chlorine/potassium chloride solution. In this process it is not necessary to separate progesterone from estrone as the progesterone and other ketonic bodies in their modified form do not interfere with proper identification of estrone. The estrone remains unchanged in the hypohalide reaction mixture and may readily be identified as described below.

The tests employed in the present invention are based upon the discoveries (1) that estrone reacts with 2,4-dinitrophenylhydrazine in an acid medium which, when made alkaline, gives a stable brown color and (2) that estrone reacts with meta-dinitrobenzene in alkaline solution to give a stable red or reddish violet color. Preferred methods of carrying out the tests are described below in the illustrative examples.

EXAMPLE I

With a calibrated dropper, place 2 ml. of urine to be tested into outer chamber 10 of the extraction apparatus and then add 2 drops of 0.5 normal sodium hydroxide. To the alkali-urine mixture next add about 2 ml. of U. S. P. chloroform, i. e. sufficient to bring the total volume up to mark 12 on chamber 10. Place screw cap 11 on chamber 10 and shake vigorously for at least about 30 seconds and then allow to stand quietly for about one minute or until the two layers (chloroform and aqueous layer) have separated sharply. Remove the screw cap and insert inner tube 13 slowly into the outer chamber until the tube is completely inserted. During this operation the upper aqueous layer containing any estrone present flows through hole or inlet opening 14 into inner tube 13. The outer chamber and inner tube are next separated and the chloroform, with a small amount of remaining aqueous solution in the chamber, is discarded. The chamber is then rinsed well with water.

About one-half of the aqueous solution in the inner tube is poured into the washed outer chamber and to this solution is added 4 drops of 0.5 normal sulfuric acid with mixing. To this mixture is next added one ml. of 0.1 per cent 2,4-dinitrophenylhydrazine in ethanol, and the resulting mixture allowed to stand for about 10 to 15 minutes. The reaction mixture is then made alkaline by the addition of one ml. of 0.5 normal sodium hydroxide. If the test is negative and estrone is not present in the test sample, the resulting brown color usually fades within two minutes. If the brown color remains for at least about five minutes (usually 5 to 10 minutes or longer) then estrone is present and the test is positive for pregnancy.

EXAMPLE II

The procedure is the same as that described in Example I up to and including the pouring of about one-half of the aqueous solution in the inner tube into the washed outer chamber. To the solution in the outer chamber is added 5 drops of one per cent meta-nitrobenzene in ethanol, with mixing. About one ml. of 15 per cent potassium hydroxide is then added and the resulting mixture allowed to stand for about 10 minutes. If no reddish violet color is observed, the test is negative, while if the solution has turned red or reddish violet the test is positive for pregnancy.

The method employed in Example II may be advantageously combined with the method employed in Example I. When this is done, a double check for the presence of estrone is obtained by testing one-half of the aqueous solution with 2,4-dinitrophenylhydrazine in accordance with Example I, and by testing the other half of the aqueous solution with metanitrobenzene in accordance with Example II.

EXAMPLE III

With a calibrated dropper, place 2 ml. of urine to be tested into the outer chamber of the extraction apparatus or other suitable container, and then add 2 drops of 0.5 normal sodium hydroxide with mixing. To the alkali-urine mixture is added 10 drops of an aqueous 2 per cent iodine/4 per cent potassium iodide solution with mixing, and the resulting reaction mixture is allowed to stand for approximately one minute. To this mixture is next added with mixing 4 drops of 0.5 normal sulfuric acid followed by 1 ml. of 0.1 per cent 2,4-dinitrophenylhydrazine in ethanol. The resulting reaction mixture is allowed to stand for about 10 to 15 minutes, and then one ml. of 0.5 normal sodium hydroxide is added. If the test is negative and estrone is not present in the test sample, the brown color formed in the solution usually fades within two minutes. If the brown color remains for at least about five minutes (usually 5 to 10 minutes or longer), then estrone is present and the test is positive for pregnancy.

EXAMPLE IV

The procedure is the same as that described in Example III up to and including the addition of the iodine/potassium iodide solution. To this mixture is added 5 drops of 1 per cent meta-nitrobenzene in ethanol, with mixing. About one ml. of 15 per cent potassium hydroxide is then added with mixing and the resulting reaction mixture allowed to stand for about ten minutes. If no reddish violet color is observed, the test is negative, while if the solution has turned reddish violet in color, the test is positive for pregnancy.

The procedure in Example IV may also be combined with the procedure described in Example III to give a double check for positive or negative results. In Examples II and IV the initial addition of alkali makes the urine solution slightly alkaline, while the final addition of alkali makes the solution relatively strongly alkaline.

In the above examples other water soluble alkalies may be used to provide the desired alkaline reaction mixtures, although in the tests employing meta-dinitrobenzene (Examples II and IV) investigation, have demonstrated potassium hydroxide to be preferred for alkalinizing the final reaction mixture. When the test is positive and estrone is present, the reddish color forms more rapidly with potassium hydroxide than when other alkalies such as sodium hydroxide are employed. In the above examples other acids may also be used to provide the desired acidic reaction mixtures, although it is preferred to employ stable mineral acids such as sulfuric acid, hydrochloric acid and the like which are relatively cheap and readily available in the open market. The use of the halogen/alkali metal halide mixture in alkaline solution is a particularly convenient means for introducing the water soluble hypohalide into the reaction mixture. In Examples III and IV above employing iodine and potassium iodide in the urine alkalinized with sodium hydroxide, the hypohalide is present as sodium hypoiodide.

Any water immiscible organic solvent may be used in the processes described in Examples I and II, although the use of solvents with about the same specific gravity as the aqueous urine is not preferred as they tend to form emulsions with the urine which do not separate rapidly into two layers. When a solvent such as ether or heptane (which are lighter than the aqueous urine) is used in place of a heavier solvent such as chloroform used in Examples I and II, the extraction apparatus shown in the drawings may still be used, but in this case the upper organic solvent layer containing the interfering steroid material flows through hole 14 into the inner tube 13 and is discarded, and the tests are conducted with the aqueous solution remaining in the outer chamber.

The present invention provides simple and inexpensive tests for determining pregnancy of the type long desired. Instead of hours or even days required for the old biological tests available heretofore, the novel chemical tests of the present invention may be easily completed in twenty minutes, and several tests may be readily run at the same time. In practice the methods of the present invention have also proven in well over a thousand tests, to be 100 per cent accurate in confirming or ruling out pregnancy.

The apparatus

In the drawing there is illustrated one form of very simple, inexpensive, and easy to use apparatus which is especially adapted to the carrying out of tests in accordance with the foregoing Examples I and II, especially the step of separating immiscible liquids.

In the drawing:

Fig. 1 is a side elevation except that upper and lower end portions are shown in section;

Fig. 2 is a side elevation; and

Fig. 3 is a diametric cross-section.

The apparatus shown in the drawing consists of the outer receptacle or chamber 10 which is a test-tube like receptacle of transparent glass, the bottom being closed as shown at 15. The upper or mouth end 16 of the receptacle is slightly contracted in size and provided with external screw threading 17 for cooperating with the internal screw threading of the cap 11. The receptacle 10 is of generally cylindrical form, and the contracted mouth end portion 16 is likewise of cylindrical form. The cap 11 may be provided with a gasket 18 which is adapted to form a leak-proof closure for the mouth end of the receptacle when the cap 11 is applied to the receptacle. The wall of the receptacle 10 is provided with the gauge mark 12 by etching or in any other suitable manner.

The inner receptacle 13 is also preferably formed of transparent glass and in the form of an ordinary test tube. The outside diameter of the receptacle 13 is somewhat less than the internal diameter of the body portion of the outer receptacle 10 so that said inner receptacle 13 will fit freely within the receptacle 10. The outer diameter of the receptacle 13 is, however, a close but easy sliding fit in the reduced diameter mouth portion 16 of the outer receptacle so that said mouth portion will effectively center the tube 13 in the outer receptacle when the two receptacles are assembled as shown in Fig. 3. To that end, the mouth portion 16 of the outer receptacle is made of substantial length as shown. The upper or mouth end of the inner receptacle 13 is provided with an outwardly extending flange 19 which may seat on the mouth end of the outer receptacle as shown at Fig. 3 to limit the extent to which the said receptacle 13 may be inserted in the outer receptacle.

The inner receptacle 13 is provided with the opening 14 in its side wall at a predetermined distance from the closed bottom end 20 of the receptacle. When the inner receptacle 13 is telescoped into the outer receptacle as shown in Fig. 3, liquid contained in the outer receptacle will, of course, be displaced and caused to rise in the space remaining between the inner and outer receptacles. Hence, the uppermost layer of immiscible liquid will be raised and caused to flow through the side wall opening 14, into the inner receptacle as indicated, thereby to separate such uppermost layer of liquid from the heavier lower layer which will remain in the outer receptacle. It will, of course, be understood that the telescopic receptacles are so proportioned in size that the space remaining within the two receptacles when telescoped, as shown in Fig. 3, will be sufficient to contain the lower layer of immiscible liquids without elevating the same high enough to flow through the opening 14 in the inner tube. Hence, when the flow of liquid into the inner tube has ceased, the inner tube may be withdrawn from the outer tube and used in the manner of an ordinary test tube for further testing operations.

The flange 19 of the inner receptacle is of such size that the cap 11 may be applied to the assembled structure so that the cap may be employed to clamp the inner receptacle in fixed position in the outer receptacle. In this manner, the testing apparatus is nested for packaging and transport as a completely packaged unit, the cap also serving to prevent the entrance of foreign material into the receptacles. If desired, a suitable gasket may be placed around the inner receptacle immediately under its mouth end flange, to cushion the contact between said flange and the end of the outer receptacle.

The described apparatus, being of simple constructional details may be produced at very low cost. Furthermore, the employment of the described apparatus requires no high degree of care and is, therefore, well adapted to use in the carrying out of tests to be made in a matter of minutes rather than hours or longer periods. Also, the apparatus is such that it may properly be used with a minimum of explanation or instruction and without practice or experience.

Changes may be made in the apparatus while retaining the principles of the described structure, and, while the described apparatus is preferred because of its simplicty, it is not essential to the practice of the testing methods hereinbefore described. Other liquid separation apparatus and procedures may be effectively employed.

We claim:

1. In a method for determining pregnancy the steps which comprise, alkalinizing female urine, extracting the alkaline urine with a water immiscible organic solvent, separating the aqueous phase of the extracted urine from the organic solvent extract, acidifying the extracted urine, adding 2,4-dinitrophenylhydrazine to the acidified urine, and alkalinizing the resulting reaction mixture.

2. In a method for determining pregnancy the steps which comprise, adding sodium hydroxide to female urine, extracting the alkaline urine with chloroform, separating the aqueous phase of the extracted urine from the chloroform extract, acidifying the extracted urine with sulfuric acid, adding 2,4-dinitrophenylhydrazine to the acidified urine, and adding sodium hydroxide to alkalinize the resulting reaction mixture.

3. A test for determining pregnancy based on the identification of estrone in urine which comprises, alkalinizing female urine by addition of alkali metal hydroxide, extracting the alkaline urine with a water immiscible organic solvent, separating the resulting aqueous urine layer from the organic solvent extract, acidifying the urine, adding 2,4-dinitrophenylhydrazine to the acidified urine, alkalinizing the reaction mixture by addition of alkali metal hydroxide, and then observing the resulting brown color formation in the alkaline reaction mixture, said test being positive for the presence of estrone when the brown color remains in the reaction mixture for at least about five minutes.

4. A test for determining pregnancy based on the identification of estrone in urine which comprises, alkalinizing female urine by addition of sodium hydroxide, extracting the alkaline urine with chloroform, separating the resulting aqueous urine layer from the chloroform extract, acidifying the urine with sulfuric acid, adding 2,4-dinitrophenylhydrazine to the acidified urine, alkalinizing the reaction mixture by addition of sodium hydroxide, and then observing the resulting brown color formation in the alkaline reaction mixture, said test being positive for the presence of estrone when the brown color remains in the reaction mixture for at least about five minutes.

GARWOOD C. RICHARDSON.
GUSTAV W. RAPP.

REFERENCES CITED

The following references are of record in the file of this patent:

UNITED STATES PATENTS

| Number | Name | Date |
| --- | --- | --- |
| 1,722,160 | Smith | July 23, 1929 |
| 1,968,131 | Edwards | July 31, 1934 |
| 2,471,861 | Cahn | May 31, 1949 |
| 2,477,072 | Maurer | July 26, 1949 |